United States Patent
Steijner

(10) Patent No.: US 8,090,421 B2
(45) Date of Patent: Jan. 3, 2012

(54) BI-STABLE SLIDING ASSEMBLY

(75) Inventor: Johan Magnus Rikard Steijner, Loddekopinge (SE)

(73) Assignee: Sony Ericsson Mobile Communications AB, Lund (SE)

( * ) Notice: Subject to any disclaimer, the term of this patent is extended or adjusted under 35 U.S.C. 154(b) by 659 days.

(21) Appl. No.: 12/244,831

(22) Filed: Oct. 3, 2008

(65) Prior Publication Data

US 2010/0087231 A1 Apr. 8, 2010

(51) Int. Cl.
*H04M 1/00* (2006.01)

(52) U.S. Cl. ............... 455/575.4; 455/575.1; 455/90.3; 361/679.09; 292/288

(58) Field of Classification Search ............. 455/575.4, 455/575.1, 90.3; 361/679.09; 292/288
See application file for complete search history.

(56) References Cited

U.S. PATENT DOCUMENTS

| | | | | |
|---|---|---|---|---|
| 2004/0142719 A1* | 7/2004 | Jung | ............... | 455/550.1 |
| 2005/0054397 A1* | 3/2005 | Kim et al. | ............... | 455/575.4 |
| 2005/0277449 A1 | 12/2005 | Wu | | |
| 2006/0183369 A1* | 8/2006 | Park | ............... | 439/517 |
| 2007/0026297 A1* | 2/2007 | Qin et al. | ............... | 429/97 |
| 2007/0293286 A1* | 12/2007 | Park et al. | ............... | 455/575.1 |
| 2008/0081505 A1* | 4/2008 | Ou et al. | ............... | 439/374 |
| 2008/0311960 A1* | 12/2008 | Kim et al. | ............... | 455/569.1 |
| 2009/0008948 A1* | 1/2009 | Ho et al. | ............... | 292/179 |
| 2009/0115881 A1* | 5/2009 | Joo et al. | ............... | 348/333.06 |
| 2009/0268389 A1* | 10/2009 | Liu et al. | ............... | 361/679.09 |

FOREIGN PATENT DOCUMENTS

| | | |
|---|---|---|
| EP | 1 513 323 | 3/2005 |
| EP | 1 793 568 | 6/2007 |
| WO | 2006/085129 | 8/2006 |

OTHER PUBLICATIONS

International Search Report and Written Opinion for corresponding application No. PCT/EP2009/053876 dated Jul. 27, 2009.

* cited by examiner

*Primary Examiner* — Danh Le
(74) *Attorney, Agent, or Firm* — Renner, Otto, Boisselle & Sklar, LLP

(57) ABSTRACT

Sliding assembly for mobile or portable terminals, comprising: a plane first main part; a plane second main part slidably connected to the first main part, the second main part being spring-loaded by a first elastic module adapted to urge the first and second main parts apart from each other, the second main part further comprising a protrusion extending towards the first main part, the sliding assembly further comprising a locking element in the first main part with a recess arranged to cooperate with a first elastic module, such that the locking element is urged against the protrusion, the second main part being arranged to cooperate with the first elastic module, such that the protrusion is urged against the locking element, the second main part of the sliding assembly thereby being held in a center position, wherein the sliding assembly further comprises an actuator arranged to overcome an elastic force exerted by the elastic element onto the locking element when being subject to an outside force, thus releasing the engagement between the locking element and the protrusion and bringing the second main part into a first end-position due to the elastic force of the first elastic module. According to a second embodiment, the sliding assembly may comprise a guide track cooperating with a stop pin included in the second elastic module.

10 Claims, 11 Drawing Sheets

BI-STABLE SLIDING ASSEMBLY

TECHNICAL FIELD

The present invention is related to sliding arrangements for portable terminals. More specifically it is related to sliding arrangement which have more than one stable position.

BACKGROUND ART

Todays market for mobile terminals, such as mobile transceivers in the form of cellular phones has grown rapidly since their first introduction over a decade ago. One clear trend for these mobile terminals is the reduction in size (both length and thickness) and the incorporation of ever more technical features into them, such as media player functions, GPS-functionality, mini-keyboards with QWERTY-layout and others.

Therefore, mobile terminals with a so called slider function have become increasingly popular. By means of the slider function, two halves of the mobile terminal can be moved in relation to each other, such that in a basic position, where the two halves cover each other completely, only basic functions of the mobile terminal are available.

In a different position where the lower half of the mobile terminal is moved out from the upper half, additional functions of the mobile terminal are uncovered. Usually, it is the keypad that is uncovered in this situation.

Most recent developments in the field of mobile terminals have resulted in mobile terminals with a slide function with three different positions. While the first and second end-positions are essentially identical with the previously described slider mobile terminals, in the second end-position, the lower half is slid above the upper half uncovering keys for operating media player functionality, browsing or games stored on the mobile terminal.

However, such newly developed sliding mechanisms have the disadvantage of a not completely stable center position. Also, there is a need for making the step of moving the mobile terminal into the two end-positions more simple and user-friendly.

Thus, there is a need for a sliding mechanism for a mobile terminal which solves at least some of the problems related to known technology.

SUMMARY OF THE INVENTION

These and other problems are solved by a sliding assembly for mobile or portable terminals according to a first embodiment of the present invention in which the sliding assembly comprises a plane first main part; a plane second main part slidably connected to the first main part, the second main part spring-loaded by a first elastic module adapted to urge the first and second main parts apart from each other, where the second main part further comprises a protrusion extending towards the first main part and where the sliding assembly further comprises a locking element in the first main part with a recess arranged to cooperate with a first elastic module, such that the locking element is urged against the protrusion, where the second main part is arranged to cooperate with the first elastic module, such that the protrusion is urged against the locking element, the second main part of the sliding assembly thereby being held in a center position, wherein the sliding assembly further comprises an actuator arranged to overcome an elastic force exerted by the elastic element onto the locking element when being subject to an outside force, thus releasing the engagement between the locking element and the protrusion and bringing the second main part into a first end-position due to the elastic force of the first elastic module.

In one variant of the sliding assembly according to the first embodiment the second main part further comprises stops and is slidable in relation to the first main part, such that it can be brought into a second end-position, when an external force overcoming the elastic force of the first elastic module in one direction is applied in the opposite direction.

In this fashion, the sliding assembly according to the present invention comprises three well-defined positions, i.e. the center and the two end-positions into which the sliding assembly can be moved rapidly by using only moderate force. In this way the transitions between the different positions are made more user-friendly.

In one other variant of the first embodiment of the sliding assembly the locking element is rotatably mounted on a pivot and where one end of the locking element is connected to the actuator. The locking element may comprise an elongated portion and a curved portion, where the elongated portion is connected to the actuator and rotatably mounted on the pivot.

Also, the curved part of the locking element may be arranged to engage the protrusion when the sliding assembly is in the first position.

In one other variant of the first embodiment of the sliding assembly the curved part may further comprise a chamfer arranged to guide the protrusion into a recess in the curved part, such that the protrusion of the second main part may be guided into the recess of the curved portion of the locking element, thereby bringing the sliding assembly from the first end-position into the center position.

In yet another variant of the first embodiment of the sliding assembly the locking element may be arranged to rotate counterclockwise around the pivot towards the elastic element when an external force is applied to the actuator.

The locking element may further comprises an ear fixedly attached to one of the parts of the sliding assembly and a loose elastic leg arranged to exert force on the locking element.

Regarding the second main part in the sliding assembly according to the first embodiment of the present invention, it may comprise a first stop, such that movement of the second main part beyond the first end-position is prevented.

Also, the second main part may further comprises a second stop, such that movement of the second main part beyond the second end-position is prevented.

Moreover, the problems related to known technology may also be solved by a sliding assembly according to a second embodiment of the present invention. In this second embodiment the sliding assembly for mobile or portable terminals comprises: a plane first main part; a plane second main part slidably connected to the first main part, where the second main part is spring-loaded by a first elastic module and where the first main part comprises a second elastic module with an elastic portion and a protrusion protruding towards the second main part, where the second main part in turn comprises a guiding arrangement with a recessed portion, the recessed portion of the second main part, the second elastic module and the first elastic module being arranged to cooperate such that the protruding portion of the second elastic module is urged against the recessed portion of the guiding arrangement, such that the second main part is held in a center position, the guiding arrangement further comprising an elongated portion arranged to guide the protruding portion of the second elastic module out of the recessed portion of the guiding arrangement when an external force is applied to overcome the elastic forces of the first elastic module, the sliding assembly thus being movable out of the center position into a first end-position.

According to a variant of the second embodiment of the sliding assembly, the elongated portion may be further arranged to guide the protruding portion of the second elastic module from the first end-position into the center position when an external force is applied to overcome the elastic force of the first elastic module urging the second main part into abutment with the first main part, the sliding assembly thus being movable out of the first end-position into the center position.

Also, the sliding assembly may be movable along the elongated portion of the guiding arrangement into a second end-position from the center position when an external force is applied to overcome the elastic force of the first elastic module urging the protruding portion of the second elastic module out of the engagement with the recessed portion of the guiding arrangement.

Moreover, the sliding assembly according to the second embodiment of the present invention may be movable along a back side of the elongated portion of the guiding arrangement into engagement with the recessed portion of the guiding arrangement from the second end-position into the center position, when an external force is applied to overcome the elastic force of the first elastic module urging the second main part into abutment with the first main part.

The advantages of the present invention will become more apparent by studying the detailed description below and the accompanying drawings.

DETAILED DESCRIPTION

Figure 1:
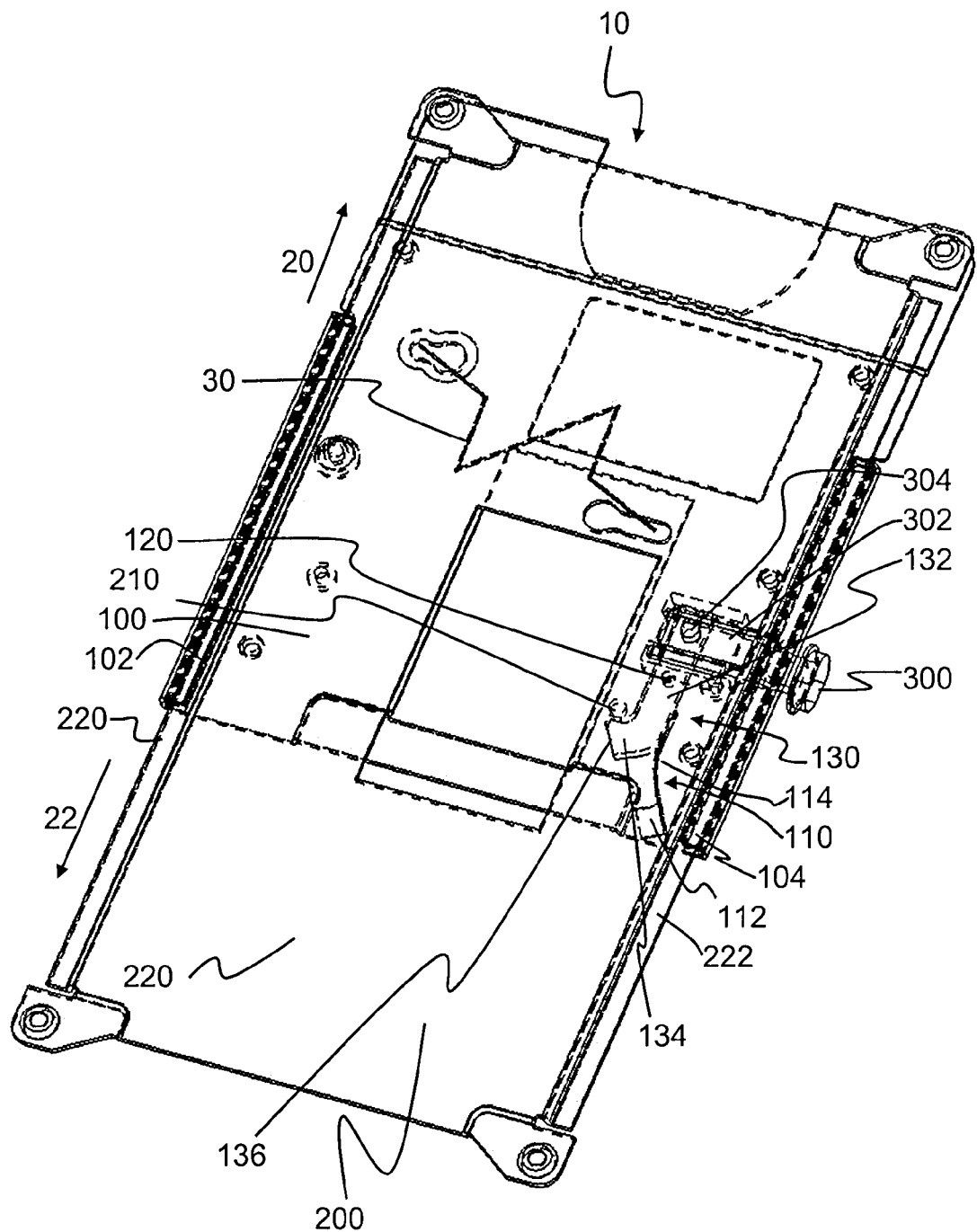
FIG. 1 is a perspective view of a first embodiment of the sliding arrangement according to the present invention seen from above.

FIG. 1 illustrates a sliding arrangement 10 according to a first embodiment of the present invention. In the figure, the sliding arrangement 10 comprises two essentially plane main parts 100 and 200 which are slidable in relation to each other. In order to achieve the sliding function the first main part 100 comprises grooves 102, 104 adapted in their diameter to accommodate the second main part 200 therein, such that the second main part 200 can be slid along the rails 220, 222 both in the upper direction indicated by the arrow 20 and the lower direction indicated by the arrow 22 in relation to the first main part 100.

Additionally, the first and second main parts 100, 200 are connected to each other via a first elastic module 30. The first elastic module 30 is biased in such a way that it exerts a force onto the first and second main parts 100, 200 to drive them apart so that the second main part 200 is either urged into the downward or upward direction marked by the arrows 22 and 20.

Now the first main part 100, which may be connected to one half of a mobile or portable terminal, comprises a second elastic module 110 which in turn comprises an ear 112 fixedly attached to the first main part 100 and a loose elastic portion 114 in the form of a blade spring.

Moreover, the first main part 100 in this embodiment also comprises an L-shaped lever 130 with an elongated portion 132 and a curved portion 134. Also, the curved portion 134 comprises a chamfer 136 whose function will be described later in relation to FIG. 2.

Additionally, the first main part 100 also comprises a pivot 120 on which the L-shaped lever 130 is rotatably mounted.

As can be seen from FIG. 1, the L-shaped lever 130 is spring-loaded by the loose elastic portion 114 of the second spring module 110 against a stop pin 210 protruding from the second main part 200 towards the first main part 100. This position of the stop pin 210 and the L-shaped lever 130 may be defined as the center position of the sliding assembly 10.

Moreover, the L-shaped lever 130 is connected to an actuator 300 via a connection pin 304 and a connection portion 302 as shown in FIG. 1

It may be mentioned that the actuator 300 in the form of a button may be connected to the first main part 100 or located between the first and second main parts 100, 200 or be located partly outside of the sliding arrangement 10. The main task of the actuator 300 is to bring the sliding arrangement 10 from the center position mentioned earlier into a first end-position which will be explained more in detail in FIG. 2.

It may also be added, that while the second main part 200 is slidable in the vertical direction indicated by the arrows 20, 22 in relation to the first main part 200, it may equally be slidable in the horizontal direction, i.e. to the left and to the right in relation to the first main part 100. This will of course necessitate the arrangement of lateral grooves in the upper and lower part of the first main part 200 accordingly. Moreover, it should be added that while first and second main parts 100, 200 may be essentially plane, their shape may also be circular or have some other suitable shape. The grooves 102, 104 and the corresponding recesses 220, 222 in the first and second main parts are then shaped accordingly in order to allow a sliding movement of the second main part 200 in relation to the first main part 100.

Moreover, the L-shaped lever 130 may not necessarily be L-shaped, but should comprise at least one curved portion and at least one essentially elongated portion.

Figure 2:
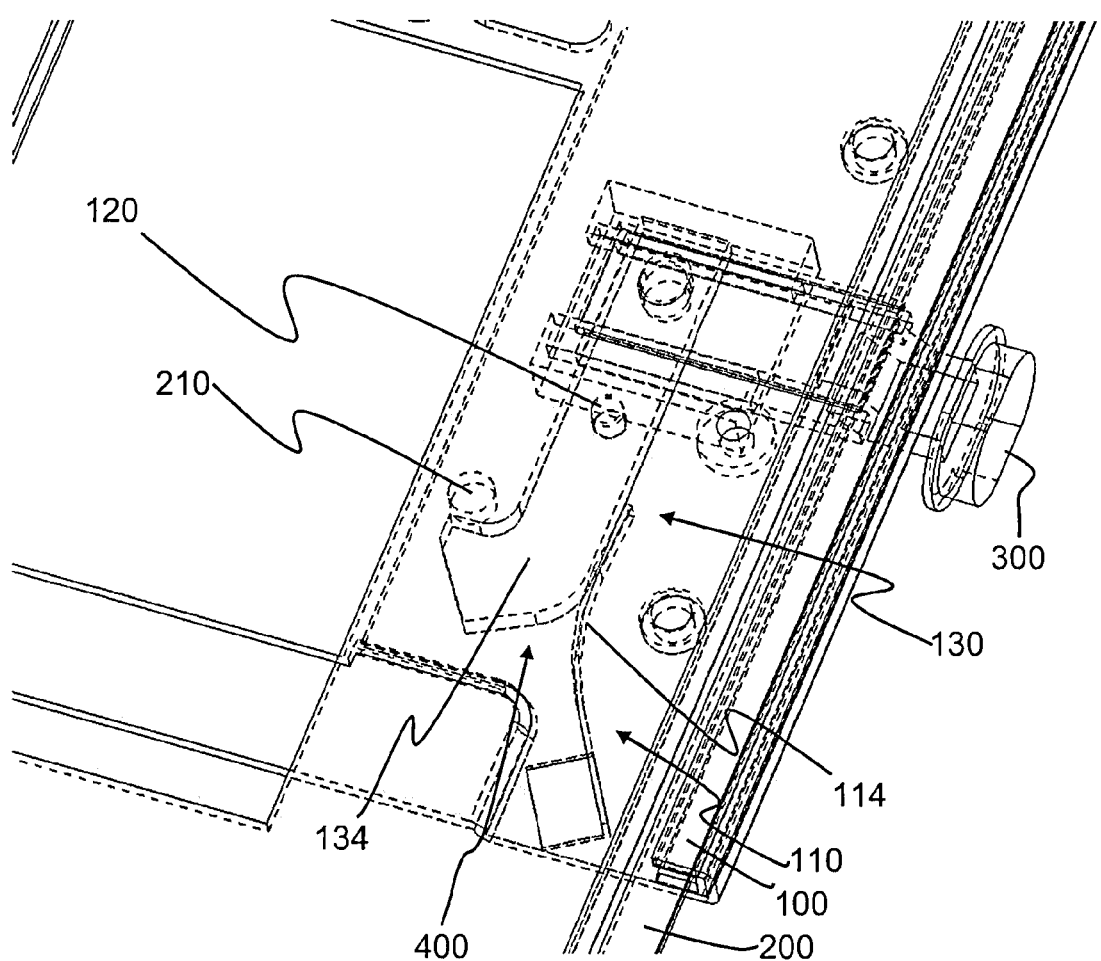
FIG. 2 illustrates a center position of the sliding arrangement according to the first embodiment present invention in detailed perspective view.

Turning now to FIG. 2, one part the sliding arrangement 10 of FIG. 1 is shown in magnified view. The position in which the lever 130, the loose elastic portion 114 and the stop pin 210 are located was earlier defined as the center position 400 of the sliding arrangement 10 according to the first embodiment of the present invention. Due to the elastic force exerted onto the lever 130, whose curved part 134 in turn is urged against the stop pin 210, the second main part 200, the movement of the second part 200 in the downward direction marked by the arrow 22 in FIG. 1 is restricted. Also, the second main part 200 is urged downward by the elastic force of the first spring module 30. Thus the elastic force of the first elastic module 30 and the second elastic module 110 together with the engagement of the L-shaped lever 130 and the stop pin 210 provides for a well-defined and stable center position of the sliding assembly 10.

In an application of the sliding arrangement from FIG. 1, where the first and second main parts 100, 200 are connected to two halves of a mobile terminal, the center position 400 may correspond to the "closed" position of a mobile terminal, where only basic functionality of the mobile terminal is displayed to the user of the mobile terminal. However, the sliding arrangement is also applicable to other portable terminals, such as portable audio/video players, GPS receivers and others.

Figure 3:
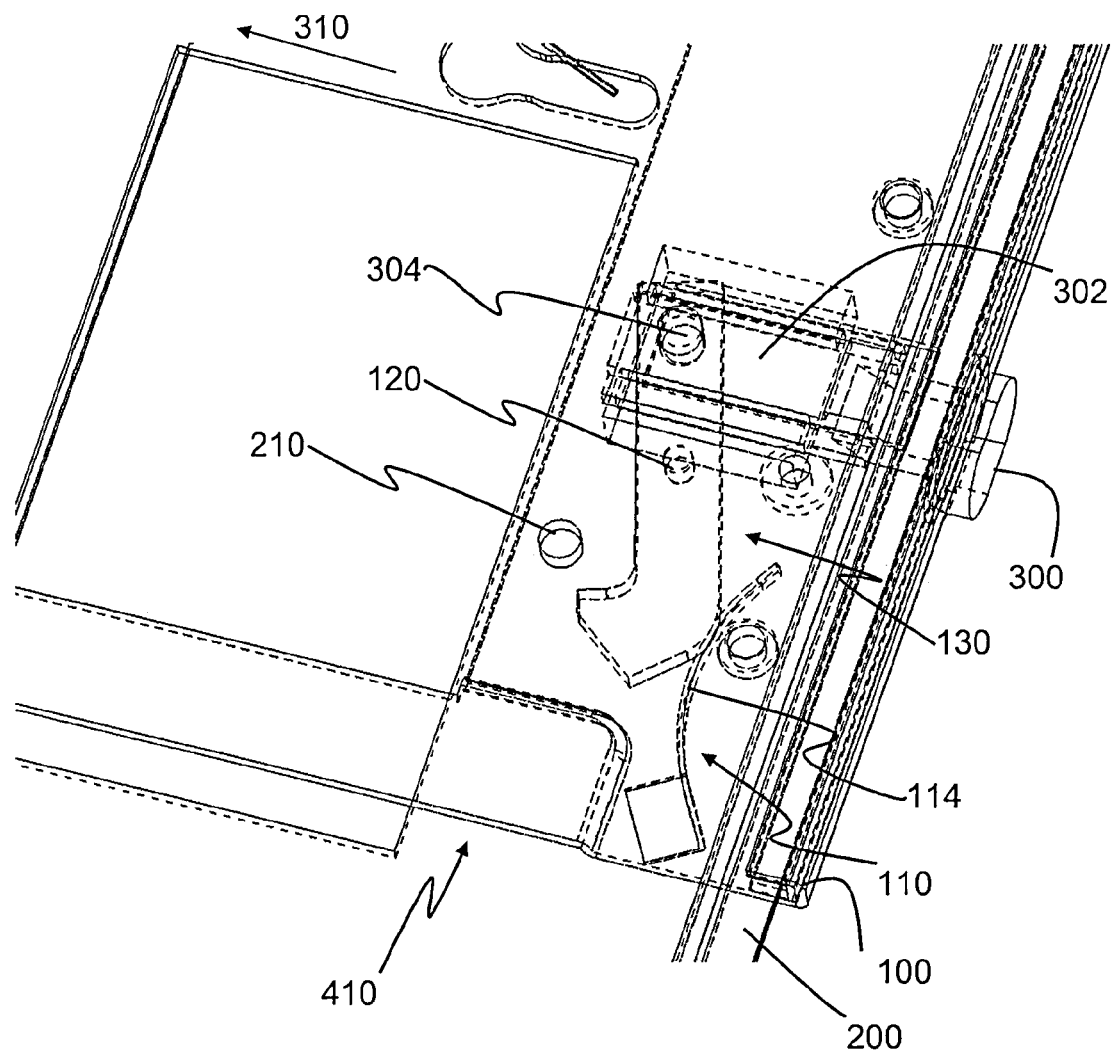
FIG. 3 illustrates an intermediate position of the sliding arrangement according to the first embodiment of the present invention in magnified perspective view.

FIG. 3 illustrates the sliding assembly 10 in an intermediate position 410 located between the center position 400 and a first end-position which will be explained more in detail in FIG. 4. In the intermediate position 410 of the sliding assembly 10 shown in FIG. 3 the actuator 300 has been subjected to an external force pressing down the actuator 300 and thereby causing the connecting portion 302 of the actuator 300 to move in the direction indicated by the arrow 310. Since the actuator 300 is connected to the lever 130 via the connecting pin 304, this translational movement of the connection portion 302 will cause the rotatably mounted lever 130 to rotate in the counterclockwise direction around the pivot 120 and against the elastic force of the loose elastic portion 114 of the second elastic module 110. This will release the engagement between the curved portion of the lever 130 in the first main part 100 and the stop pin 210 in the second main part 200. At the same time, the elastic force from the first spring module 30 will urge the second main part to move in the downward direction (the direction of the arrow 22).

Figure 4:
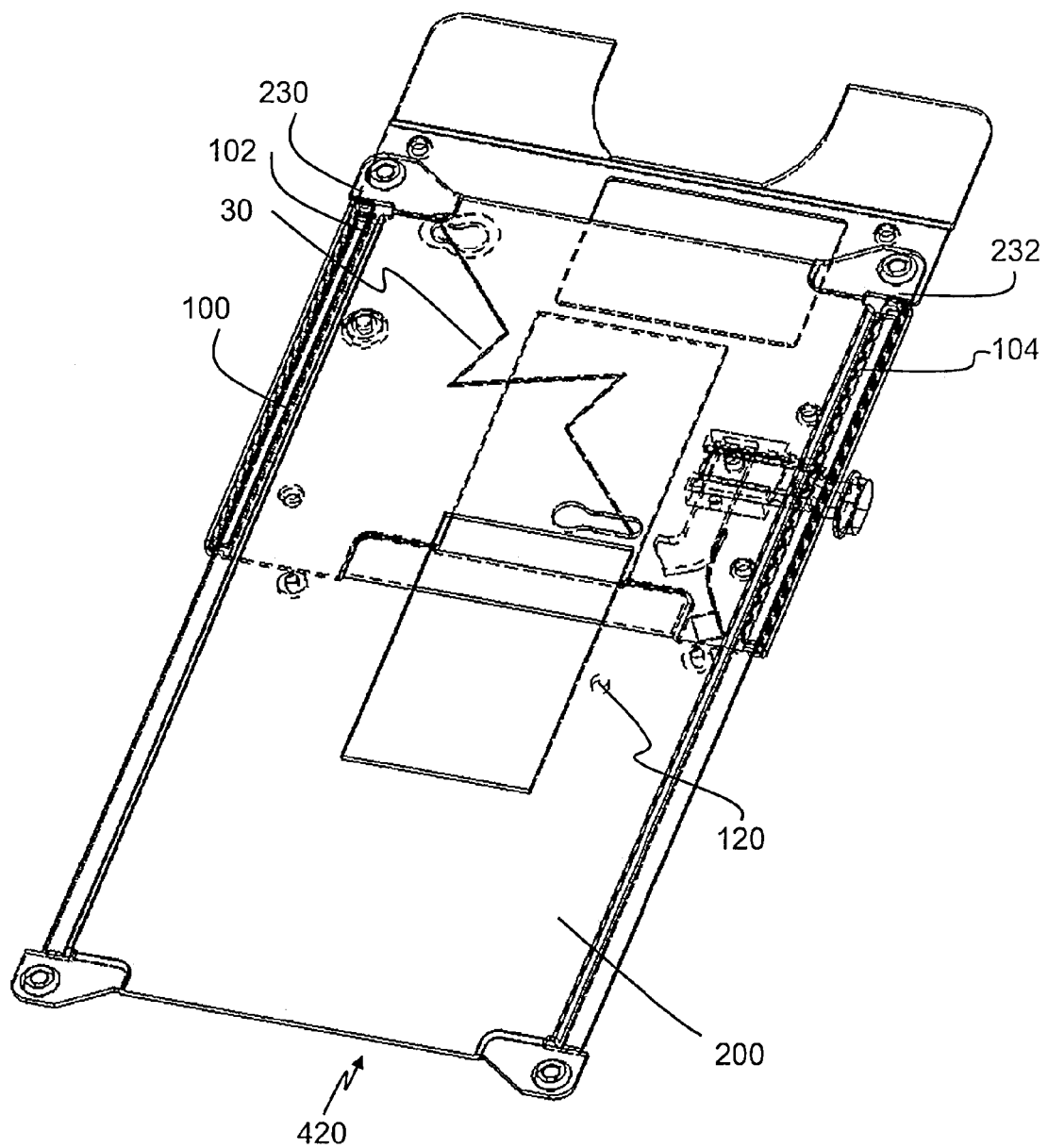
FIG. 4 illustrates a first end-position of the sliding arrangement according to the first embodiment of the present invention in magnified perspective view.

In FIG. 4 a first end-position 420 of the sliding assembly 10 is illustrated, where the second main part 200 is in one of its end-positions. After the actuator 300 from FIG. 3 has been pressed the second main part 200 will be urged by the elastic force of the first spring module 30 from the intermediate position in FIG. 3 into the end-position 420 in FIG. 4. Also, it is seen from FIG. 4 that the stop pin 120 has been moved downwards and away from the first main part 100. The advantage of the sliding assembly 10 according to the present invention is that by a simple application of external force on the actuator 300 the sliding assembly is transferred from a stable center position 400 into a well-defined and stable first end-position 420. The reason for the first end-position being well-defined and stable is that the second main part 200 is held in the first end-position 420 by the elastic force of the first elastic module 30 while at the same being time limited in further downward movement by the abutment of the first stop 230, 232 against the edges of the grooves 102, 104 in the first main part 100. Hereby, in order to move the sliding assembly 10 out of the first end-position 420, it is necessary to exert a force on the second main part 200 which will overcome the elastic force of the first elastic module 30.

In addition, the sliding assembly 10 may be brought from the first end-position 420 back into the center position 410 by applying a force strong enough to overcome the elastic force of the first elastic module 30. Since the L-shaped lever 130 comprises a chamfer on its curved portion 134 the stop pin 210 of the first main part will urge the L-shaped lever 130 into counterclockwise rotation against the elastic force of the second elastic module 110 by transferring the external force applied to the second main part 200 onto the chamfer 136. Rotation of the L-shaped lever 130 in the counterclockwise direction will be very slight and as soon as the stop pin 210 has passed the tip of the curved portion of the L-shaped lever 130, the stop pin 210 will be held in place by the elastic forces of the first and second elastic modules 30 and 110. The elastic force of the first elastic module 30 will thereby urge the second main part 200 downwards, while the elastic force of the second elastic module 110 will urge the curved part of the L-shaped lever 130 towards the stop pin 210. This slight rotation of the L-shaped lever 130 will necessitate only a slight application of external force on the second main part 200 by a user giving the user a feeling of rapid transition from one well-defined and stable position (the first end-position 430) into another (the center position 400).

It may be added that in an application where the sliding assembly is used in a mobile or portable terminal, this first end-position of the sliding assembly 10 corresponds to the position in which keys related to media functionality or web-browsing on the mobile or portable terminal is visible.

Figure 5:
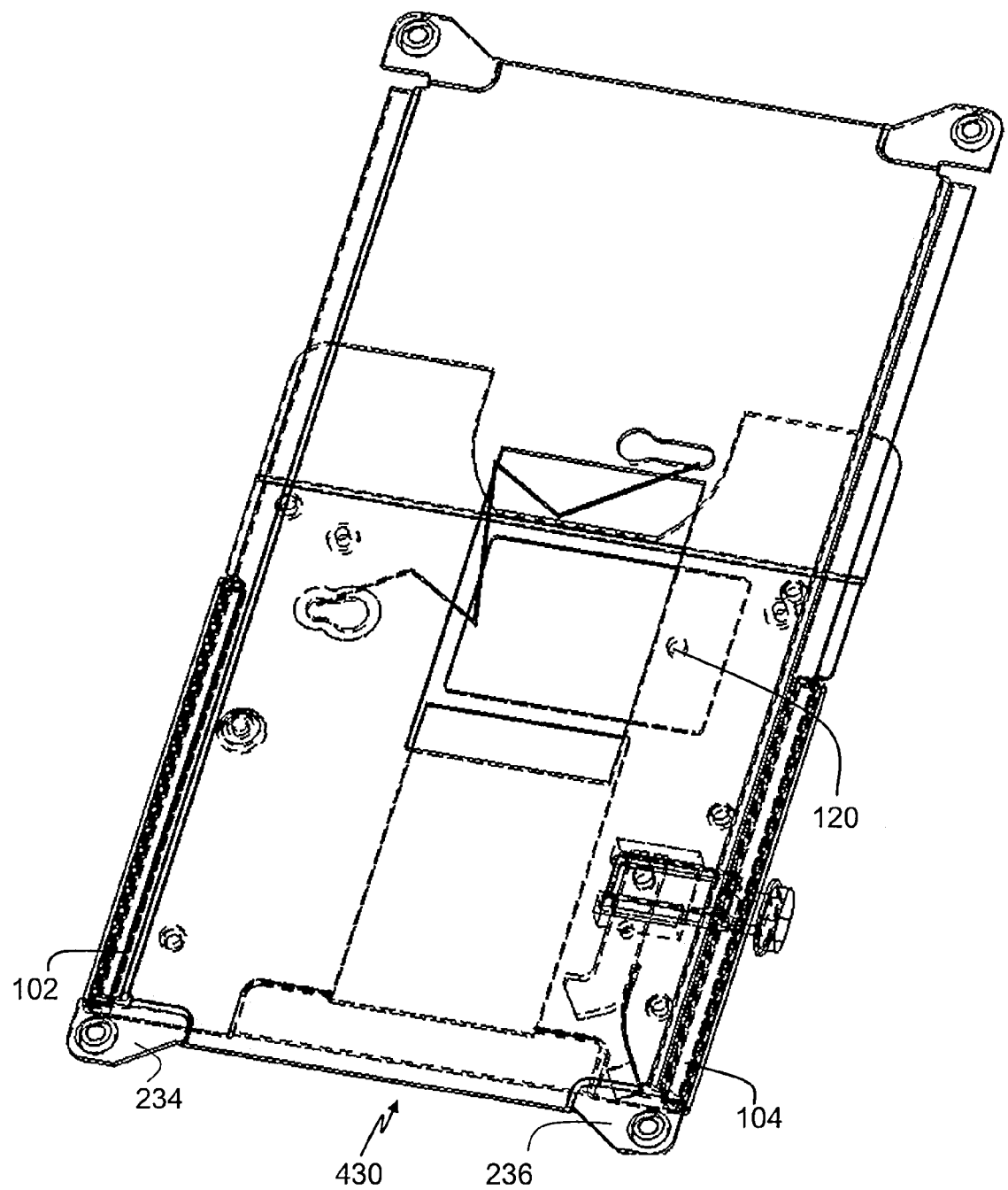
FIG. 5 illustrates a second end-position of the sliding arrangement according to the first embodiment of the present invention in magnified perspective view.

In FIG. 5, the sliding assembly 10 is illustrated in a second end-position 430. Here, the second main part 200 has been moved upwards in the direction of the arrow 20 towards a second end-position. In order to move the second main part 200 of the sliding assembly 10 either from the center or first end-position 410, 420 into the second end-position 430 a force on the second main part 200 has to be applied overcoming the elastic force of the first elastic module 30 pressing the second main part 200 downward. Once the force of the first elastic module 30 is overcome, the first elastic module 30 will push the second main part 200 by means of its elastic force into the second end-position. In this fashion a moderate use of external force on the second main part 200 will bring it rapidly into the second end-position. After the second main part has been brought into the second end-position 430 it is held there by the elastic force of the first elastic module 30 urging the lower stops 234, 236 of the second main part 200 against the edge of the grooves 102, 104 in the first main part 100. Thus a third well-defined position for the sliding assembly 10 is achieved 10 according to the first embodiment of the present invention.

A user of the mobile of portable terminal in which the siding assembly 10 is used will therefore have a feeling of a rapid transition from the first end-position or the center position into a well-defined and stable second end-position.

Here, it may be added that in an application where the sliding assembly is used in a mobile or portable terminal, this second end-position 430 of the sliding assembly 10 corresponds to the position in which the keypad of the mobile or portable terminal is visible.

Figure 6:
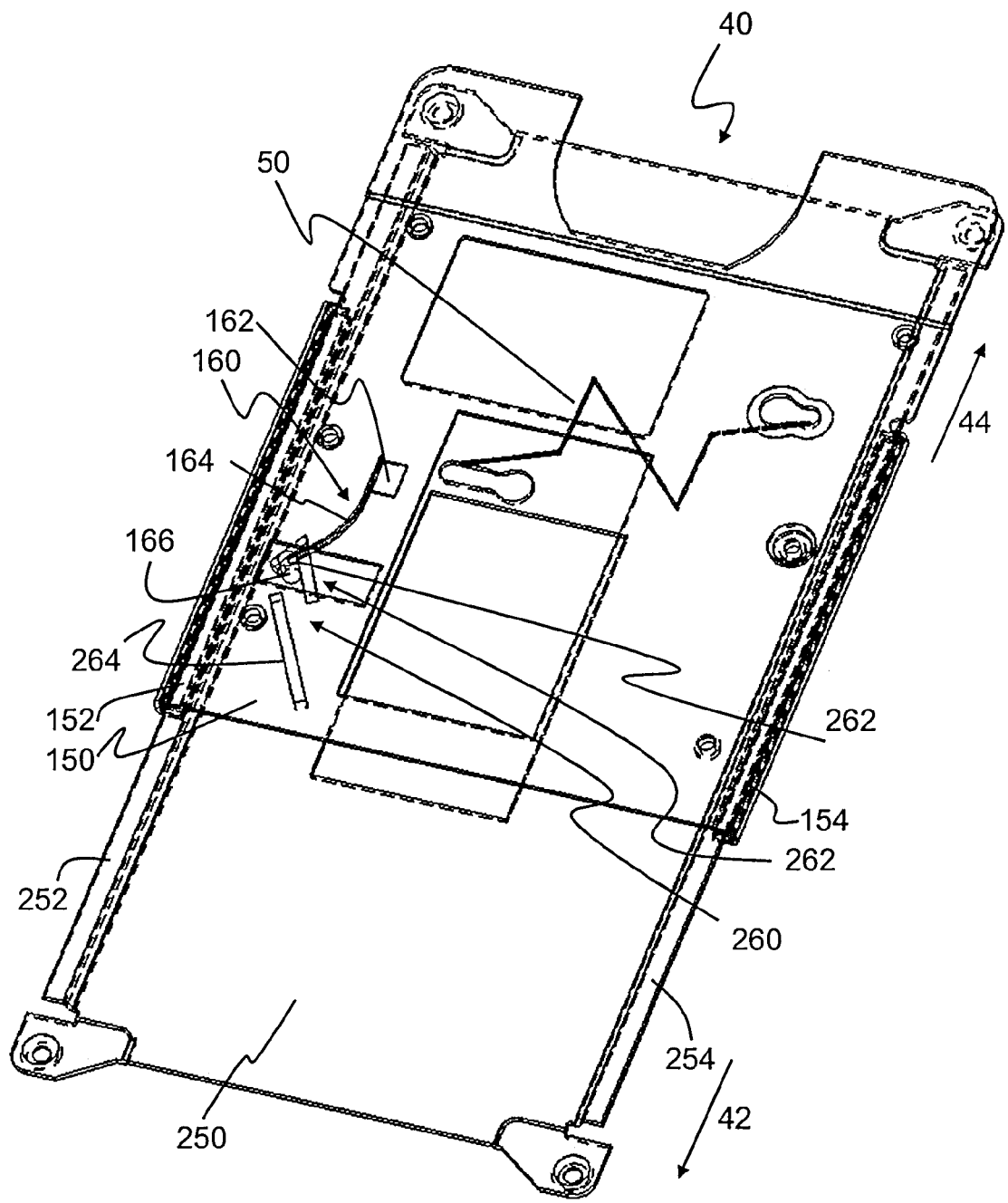
FIG. 6 is a perspective view of a second embodiment of the sliding arrangement according to the present invention seen from below.

FIG. 6 shows a perspective view of the sliding assembly 40 according to a second embodiment of the present invention viewed from below or from the backside. Analogous to the first embodiment of the sliding assembly depicted in FIGS. 1-5, the sliding assembly 40 according to the second embodiment of the present invention comprises a first main part 150 and a second main part 250. Also analogous to the first main part in FIGS. 1-5, the first main part 150 in FIG. 6 comprises grooves 152, 154 for accommodating the rails 252, 254 of the second main part 250 so that the second main part 250 is able to slide in relation to the first main part 150. Besides the sliding connection between the first and the second main part 150, 250 the two main parts are also connected to each other by means of a first elastic module 50.

Now the second main part 250 also comprises a guiding arrangement 260 with a first V-shaped-guiding track 262 and a second essentially elongated guiding track 264, which in the embodiment in FIG. 6 are divided into two separate parts. It should be understood however, that the guiding arrangement 260 may also be formed as one integral element, as desired.

The first main part 150, in turn, comprises a second elastic module 160 with an ear 162 fixedly attached to the surface of the first main part 150, a loose elastic portion 164 and a stop pin 166 located at the end of the loose elastic portion 166 and extending toward the second main part 250.

In the following, the function of the sliding assembly 40 will be explained more in detail. By means of the first elastic module 50, the first and the second main parts 150, 250 are spring loaded in such a way that the elastic force of the first elastic module 50 is driving the first and second main parts 150, 250 in opposite directions marked by the arrows 42 (downward) and 44 (upward). At the same time, this elastic force of the first elastic module 50 is urging the stop pin 166 of the second elastic module 160 in the situation illustrated in FIG. 6 into engagement with the recess of the V-shaped guide track 266 of the guide arrangement 260. Also, the elastic force of the first elastic module 50 is biasing the loose elastic portion 164 of the second elastic module 160 into the biased position in FIG. 6. This center position of the second main part 250 in relation to the first main part 150 will be illustrated more in detail in FIG. 7.

Now, in order to move the second main part 250 out of the position in FIG. 6, i.e. out of the engagement with the recess of the V-shaped guide track 266 of the guiding arrangement 260, an external force overcoming the elastic force of the first elastic module 50 directed downward in the direction of the arrow 42 has to be applied to the second main part 250. No elastic force of the second elastic module 160 has to be overcome, since the elastic portion 164 of the second elastic module 160 tends to be straight.

Figure 9:
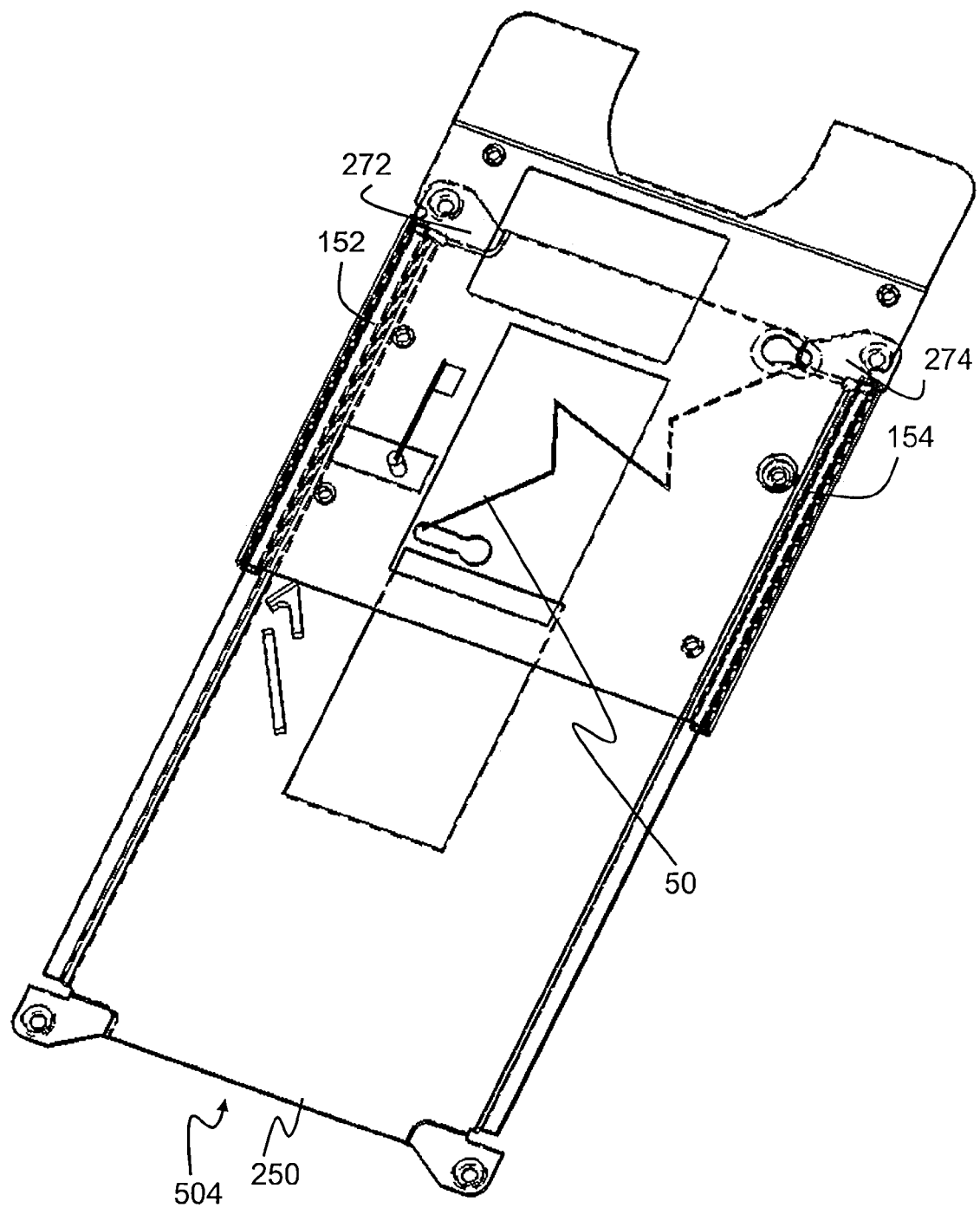
FIG. 9 illustrates a second end-position of the sliding arrangement according to the second embodiment of the present in perspective view.
Figure 11:
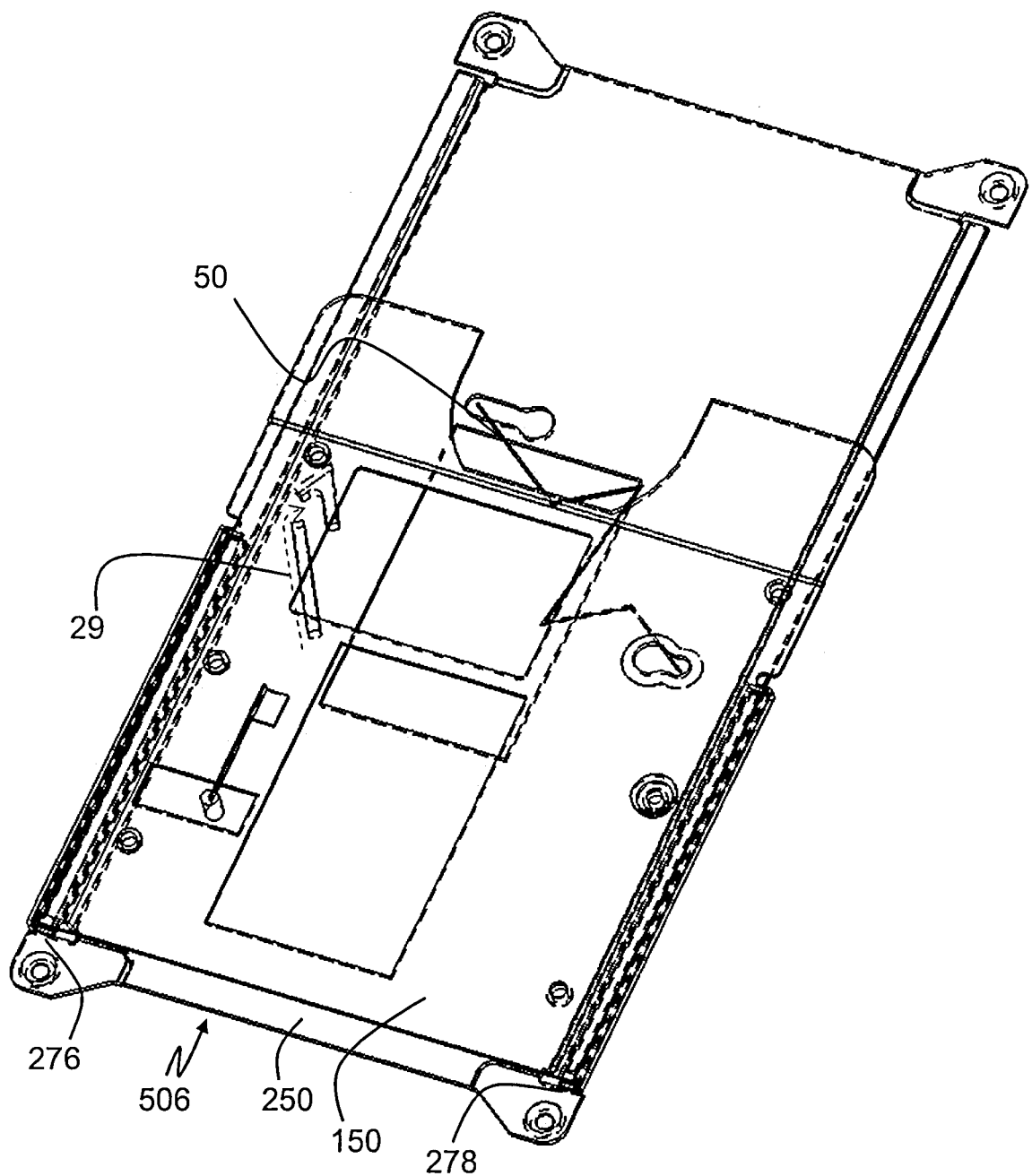
FIG. 11 illustrates a second end-position of the sliding arrangement according to the second embodiment of the present invention in perspective view.

In order to ensure guiding of the stop pin 166 into or out of the recess of the V-shaped guide track 266 from one of the end-positions illustrated in FIGS. 9 and 11, the guiding arrangement 260 additionally comprises an elongated guide track 264. Thus, when moving the second main part 250 from the center position downward in the direction of the arrow 42 into a first end-position, the stop pin 166 is guided out of the recess in the V-shaped guide track 262 and along the elongated guide track 264. On the other hand, the stop pin 166 will be guided on the backside of the elongated guide track 264 when being moved from a downward position back into the recess in the V-shaped guiding track 266. One of the advantages of the sliding assembly 40 of the present invention is the existence of at least three well-defined and stable positions of the second main part 250 in relation to the first main part 150 and a rapid transition between these positions due to the action of the elastic force from the first elastic module 50. In the remaining part of the description, these three positions as well as the transitions between them will be explained more in detail.

Figure 7:
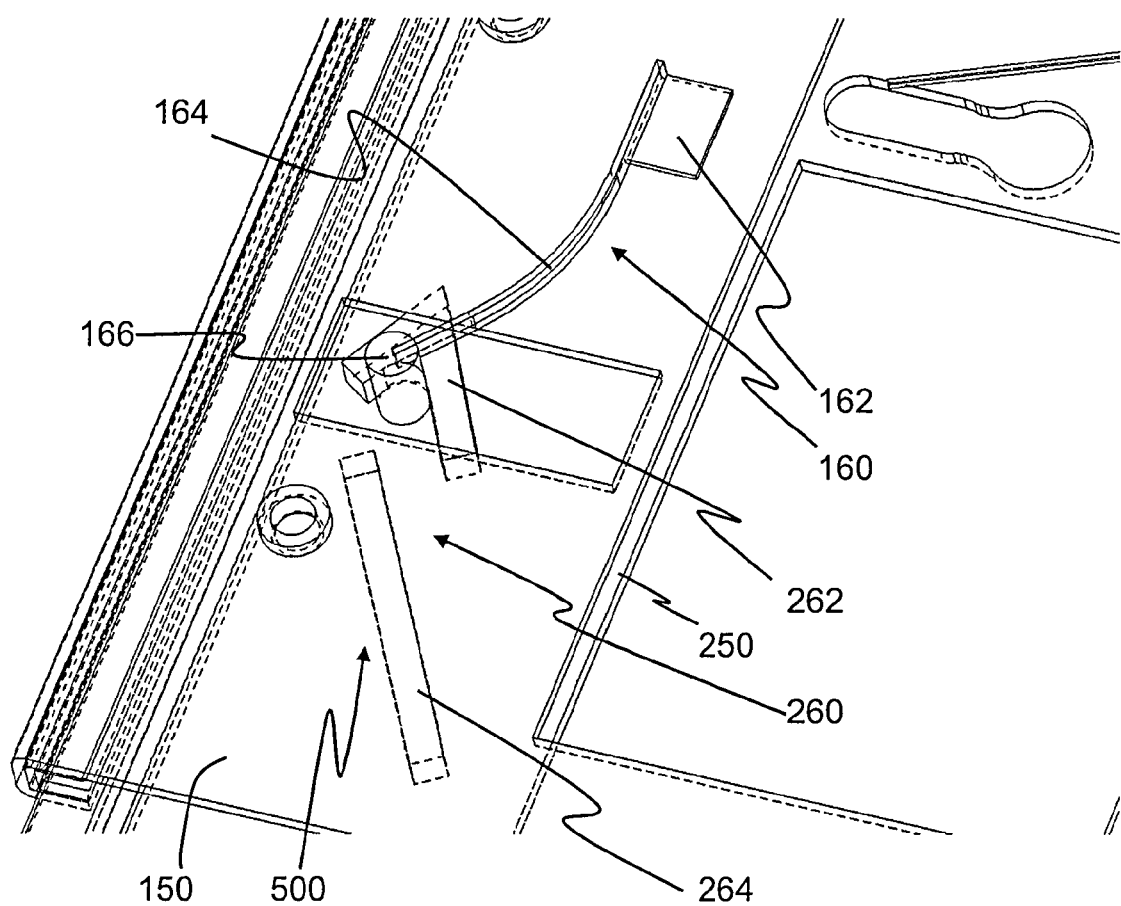
FIG. 7 illustrates a center position of the sliding arrangement according to the second embodiment of the present invention in magnified perspective view.

FIG. 7 illustrates in magnified perspective view the center position of the sliding assembly from FIG. 6. In this position, the stop pin 166 located in the recess of the V-shaped guide track 262 is urged against it by means of the elastic force of the first elastic module 50 urging the second main part in the downward direction. At the same time, the elastic portion of the second elastic module is bent towards the recess of the V-shaped guide track 262. As already mentioned earlier, this center position may correspond to the position of a slidable mobile terminal or media player where only basic functionality is displayed to the user of the device.

Figure 8:
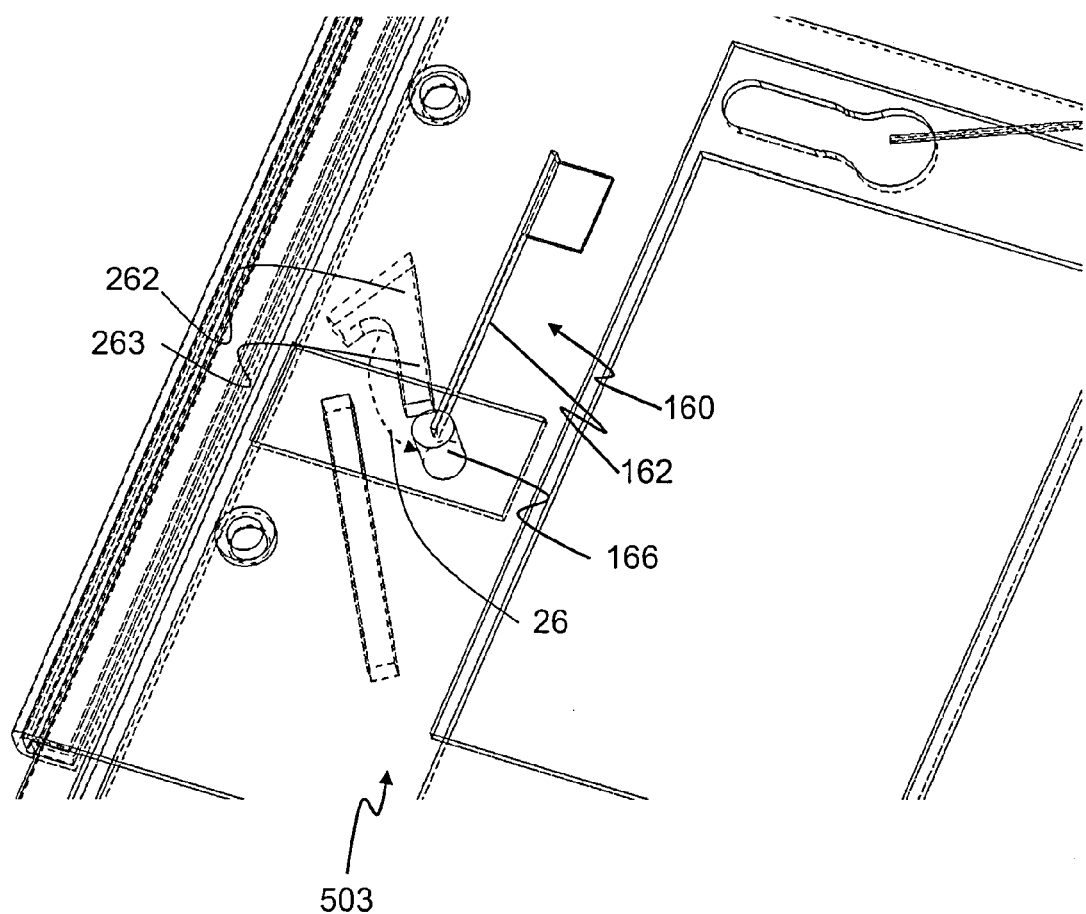
FIG. 8 illustrates a first intermediate position between the center and a first end-position of the sliding arrangement according to the second embodiment of the present invention in magnified perspective view.

FIG. 8 illustrates a first intermediate position 503 between the center position 500 and a first end-position of the sliding assembly 40.

In the first intermediate position 503, the stop pin 166 of the second elastic module 160 is located outside of the guiding arrangement 260. Also, in this intermediate position the elastic portion 164 of the second elastic module 160 is unbiased. From the first intermediate position 503, the second main part 250 may then be moved into the first end-position illustrated in FIGS. 9 and 10.

In order to move the sliding assembly 40 from the center position 500 into the first intermediate position 503 an external force has to be applied to counteract the effect of the elastic force of the first elastic module 50 urging the stop pin 166 of the first main part 150 into engagement with the recess in the V-shaped track 262 of the guiding arrangement 260 in the second main part 250. Once the elastic force of the first elastic module 50 is overcome, the stop pin 166 may be guided along the guiding portion 263 of the V-shaped track 262 towards the first intermediate position indicated in FIG. 8. It should be mentioned, that only a moderate use of external force has to be applied in order to achieve this. Also, since the elastic force of the second elastic module 160 tends to move the biased elastic portion 162 back into the unbiased position, this will accelerate the movement of the stop pin 166 into the intermediate position in FIG. 8, Thereby, the stop pin 166 will have moved along the trajectory 26.

Now from this first intermediate position 503, the second main part 250 of the sliding assembly 40 will be urged by the elastic force of the first elastic module 50 into a first end-position as illustrated in FIG. 9. Thus, a rapid transition from the first intermediate position 503 into the first end-position in FIG. 9 is achieved with only a moderate use of external force.

FIG. 9 illustrates a first end-position 504 of the sliding arrangement 40, where the second main part 250 has been moved into a downward end-position. In this end-position, the upper stops 272, 274 of the second main part 250 have come into abutment with the edges of the grooves 152, 154 in the first main part 150. At the same time, the second main part 250 is held in this first end-position 504 by means of the elastic force of the first elastic module 50 urging the upper stops 272, 274 against the aforementioned edges of the grooves 152, 154. In this end-position external force has to be applied to the second main part 250 in order bring the sliding assembly 40 out of the end-position. Hence, the sliding assembly 40 according to the second embodiment of the present invention has a well defined and stable first end-position which. In this first-end position 504, a user of the mobile or portable terminal comprising the sliding assembly 40 may be presented with keys for using the media player or web browsing functionality of the mobile or portable terminal.

Figure 10:
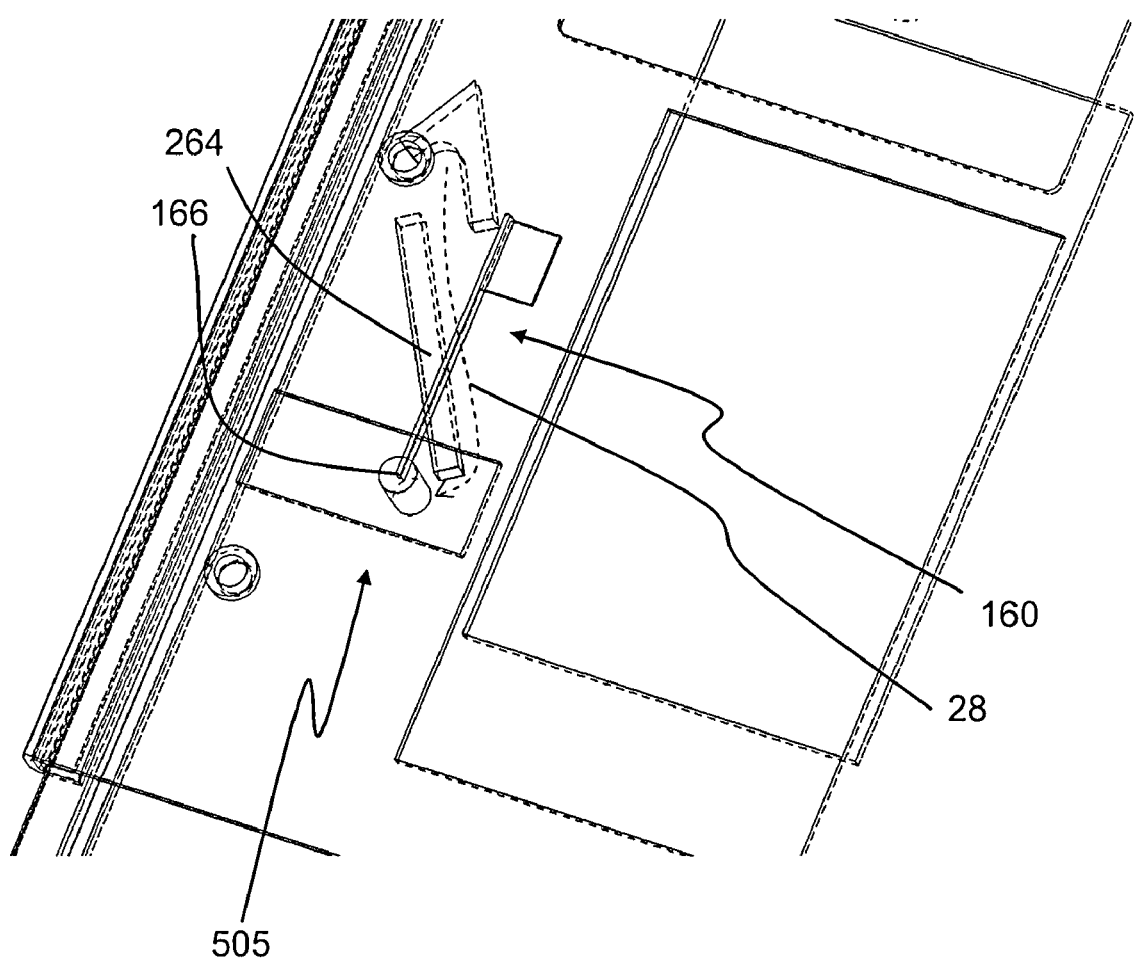
FIG. 10 illustrates a second intermediate position between the center and a first end-position of the sliding arrangement according to the second embodiment of the present invention in magnified perspective view.

In FIG. 10 a second intermediate position 505 between the center position 500 and a second end-position of the sliding assembly 40 is illustrated. This intermediate position 505 is achieved through application of an external force overcoming the elastic force of the first elastic module 50 exerted on the second main part 250 in the downward direction. No elastic force from the second elastic module 160 need to be overcome, since this elastic force tends to urge the elastic portion 162 into the unbiased position shown in FIGS. 10 and 11. The trajectory along which stop pin 166 of the second elastic module 160 is guided from the center position into the second intermediate position 505 is shown by the dashed line 26.

This second intermediate position 505 is characterized by the stop pin 166 of the second elastic module 160 being located below the elongated guiding track 264 of the guiding arrangement 260.

From this second intermediate position 505 the second main part 250 will be moved upward by the elastic force of the first elastic module 50 into the position illustrated in detail in FIG. 11

FIG. 11 illustrates a second end-position 506 of the sliding assembly 40 according to a second embodiment of the present invention in perspective view.

In this second end-position the second main part 250 is in its upward end-position. Here, the lower stops 276, 278 of the second main part 250 abut the edges of the grooves 152, 154 in the first main part 150. At the same time the second main part 250 is held in abutment with the edges of the grooves 152, 154 by the elastic force of the first elastic module 50 urging the second main part in the upward direction. Thus a third distinct and stable end-position for the sliding assembly 40 is achieved.

In order to move the second main part 250 into the second end-position 506 from the center position depicted in FIG. 7 an external force directed upward in the direction of the arrow 44 has to be applied to the second main part 250 overcoming the elastic force of the first elastic module 160 and the second elastic module 50.

If on the other hand, the sliding assembly 40 is initially in the first end-position 504, an external force moving the second main part 250 in the upward direction overcoming the elastic force of the first elastic module 50 has to be applied. Once this elastic force is overcome, the first elastic module 50 will push the second main part into the second end-position 506 in FIG. 9

Moreover, when moving the second main part 250 from the second end-position 506 into the center position 500 in FIG. 7, an external force moving the second main part 250 downward and overcoming the elastic force of the first elastic module 50 has to be applied. At the same time the elastic force of the first elastic module 50 is going to push the stop pin 166 of the second elastic module 160 against the backside of the elongated guide track 264 of the guide arrangement 260 and further into the recess of the V-shaped guide track 262 along the line indicated by the arrow 29 in FIG. 11.

It may be added here, that the elasticity of the first elastic module 50 can be chosen such that only moderate use of external force should be sufficient to overcome the elastic force of the first elastic module 50.

It should be understood that the first and second main parts 150, 250 according to the first and second embodiment of the present invention are essentially plane, but that they otherwise are not constrained by any special shape. Thus they may be rectangular, quadratic, triangular, circular or have any other geometrical shape.

Also, it may be added that the skilled person having studied the above two embodiments of the sliding assembly according to the present invention may use a button and a spring-loaded lever mechanism which does not necessarily have to have the shape depicted in FIGS. 1-5.

The same goes for the guiding arrangement 260 depicted in FIGS. 6-11. It may consists of two parts, like the one illustrated in these figures, but it may equally be one integral unit of other shapes, such as S-shaped, C-shaped or have any other geometrical shape as long as it comprises a recess and two guiding tracks.

Thus the spirit and scope of the present invention is only limited by the accompanying claims.

The invention claimed is:

1. Sliding assembly for mobile or portable terminals, comprising: a plane first main part; a plane second main part slidably connected to the first main part, the second main part being spring-loaded by a first elastic module adapted to urge the first and second main parts apart from each other, the second main part further comprising a protrusion extending towards the first main part, the sliding assembly further comprising a locking element in the first main part with a recess arranged to cooperate with a first elastic module, such that the locking element is urged against the protrusion, the second main part being arranged to cooperate with the first elastic module, such that the protrusion is urged against the locking element, the second main part of the sliding assembly thereby being held in a center position, wherein the sliding assembly further comprises an actuator arranged to overcome an elastic force exerted by the elastic element onto the locking element when being subject to an outside force, thus releasing the engagement between the locking element and the protrusion and bringing the second main part into a first end-position due to the elastic force of the first elastic module.

2. Sliding assembly according to claim 1, wherein the second main part further comprises stops and is slidable in relation to the first main part, such that it can be brought into a second end-position, when an external force overcoming the elastic force of the first elastic module in one direction is applied in the opposite direction.

3. Sliding assembly according to claim 1, wherein the locking element is rotatably mounted on a pivot and where one end of the locking element is connected to the actuator.

4. Sliding assembly according to claim 3, wherein the locking element comprises an elongated portion and a curved portion, the elongated portion being connected to the actuator and rotatably mounted on the pivot.

5. Sliding assembly according to claim 4, wherein the curved part is arranged to engage the protrusion when the sliding assembly is in the first position.

6. Sliding assembly according to claim 5, wherein the curved part further comprises a chamfer arranged to guide the protrusion into a recess in the curved part, such that the protrusion of the second main part may be guided into the recess of the curved portion of the locking element, thereby bringing the sliding assembly from the first end-position into the center position.

7. Sliding assembly according to claim 4, wherein the locking element is arranged to rotate counterclockwise around the pivot towards the elastic element when an external force is applied to the actuator.

8. Sliding assembly according to claim 1, wherein the elastic element comprises an ear fixedly attached to one of the parts of the sliding and a loose elastic leg arranged to exert force on the locking element.

9. Sliding assembly according to claim 1, wherein the second main part comprises a first stop, such that movement of the second main part beyond the first end-position is prevented.

10. Sliding assembly according to claim 1, wherein the second main part comprises a second stop, such that movement of the second main part beyond the second end-position is prevented.

* * * * *